(12) United States Patent
Grazioso et al.

(10) Patent No.: US 8,884,213 B2
(45) Date of Patent: Nov. 11, 2014

(54) ENERGY CORRECTION FOR ONE-TO-ONE COUPLED RADIATION DETECTORS HAVING NON-LINEAR SENSORS

(75) Inventors: Ronald Grazioso, Knoxville, TN (US); Debora Henseler, Erlangen (DE); Nan Zhang, Knoxville, TN (US)

(73) Assignees: Siemens Medical Solutions USA, Inc., Malvern, PA (US); Siemens Aktiengesellschaft, Munich (DE)

( * ) Notice: Subject to any disclaimer, the term of this patent is extended or adjusted under 35 U.S.C. 154(b) by 240 days.

(21) Appl. No.: 13/539,931

(22) Filed: Jul. 2, 2012

(65) Prior Publication Data

US 2013/0009047 A1    Jan. 10, 2013

Related U.S. Application Data

(60) Provisional application No. 61/504,724, filed on Jul. 6, 2011.

(51) Int. Cl.
*G01T 1/202* (2006.01)
*G01T 1/24* (2006.01)

(52) U.S. Cl.
CPC ............. *G01T 1/248* (2013.01); *G01T 1/202* (2013.01)
USPC ................................ 250/252.1; 250/361 R

(58) Field of Classification Search
CPC ..... G01T 1/2985; G01T 1/1647; G01T 1/164; G01T 1/202; G01T 1/1644; G01T 1/1648; G01T 1/1603; G01T 1/1612; G01T 1/1642; G01T 1/20; G01T 1/16; G01T 1/1615; G01T 1/2002; G01T 1/208; G01T 1/249; G01T 1/161; G01T 1/1641; G01T 1/166; G01T 1/1663; A61N 2005/1052; A61N 2005/1087; A61N 5/1048; A61N 5/10; A61N 5/1049; A61N 5/1065; A61N 5/1067; A61N 5/1077; A61N 5/1079; H01L 27/14663
USPC ........................................ 250/363.03, 363.04
See application file for complete search history.

(56) References Cited

U.S. PATENT DOCUMENTS

2011/0215248 A1* 9/2011 Lewellen et al. ......... 250/363.03
2011/0272587 A1* 11/2011 Siegel et al. ................... 250/362
2012/0228484 A1* 9/2012 Burr ............................ 250/252.1

OTHER PUBLICATIONS

McGraw-Hill, Dictionary of Engineering, 2003, The McGraw-Hill Companies, Second Edition, p. 191.*

* cited by examiner

*Primary Examiner* — David Porta
*Assistant Examiner* — Adam J Fifth
(74) *Attorney, Agent, or Firm* — Peter Kendall

(57) ABSTRACT

Systems and methods for correcting output signals from non-linear photosensors, specifically silicon photomultipliers (SiPMs). SiPMs are used in a PET detector to readout light emissions from LSO scintillator crystals. The non-linear output of the SiPM can distort and compress the energy spectrum which is crucial in PET imaging. The non-linearity effect for inter-crystal scattered events can place an energy event outside of the PET detector energy window, resulting in a rejected event. Systems and methods to correct the SiPM non-linearity for inter-crystal scattered events, so as to be able to obtain the proper energy event and produce an accurate medical image, are disclosed.

15 Claims, 7 Drawing Sheets

ENERGY CORRECTION FOR ONE-TO-ONE COUPLED RADIATION DETECTORS HAVING NON-LINEAR SENSORS

CROSS-REFERENCE TO RELATED APPLICATIONS

This application claims the benefit of U.S. Provisional Patent Application 61/504,724, filed on Jul. 6, 2011, the entire disclosure of which is hereby incorporated by reference.

TECHNICAL FIELD

The technology of this application relates to the field of nuclear medical imaging systems electronics. Particularly, the technology relates to systems and methods for correcting the output signals from non-linear photosensors, specifically silicon photomultipliers (SiPMs).

BACKGROUND

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT), electron-beam X-ray computed tomography (CT), magnetic resonance imaging (MRI), and ultrasound (US). Using these or other imaging types and associated machines, an image or series of images may be captured. Other devices may then be used to process the image in some fashion. Finally, a doctor or technician may read the image in order to provide a diagnosis. Thus, systems and methods which enhance the accuracy of the images can be beneficial in describing and treating medical conditions.

Positron emission tomography (PET) is a nuclear medicine imaging technique that produces a three-dimensional image or picture of functional processes in the body. The system detects pairs of gamma rays emitted indirectly by a positron-emitting radionuclide (tracer), which is introduced into the body on a biologically active molecule. Three-dimensional images of tracer concentration within the body are then constructed by computer analysis. Data collection in PET can involve the use of scintillation detectors. A scintillation detector or scintillation counter is obtained when a scintillator is coupled to an electronic light sensor.

Photosensors can include an array of independent Geiger-mode avalanche photodiode (APD) cells, each with an integrated quenching resistor. When an individual APD absorbs one or more photons, it may go into avalanche. The avalanche is quenched as current flows through the quenching resistor, producing a bias voltage drop on the diode. Since all of the APDs are connected to a common electrode, if the SiPM is hit by a pulse of light, the charge dumped onto the electrode will be proportional to the number of APDs that fire, and, therefore, proportional to the number of incident photons.

Scintillation detection is one application of SiPMs in which pulses of light, often containing large numbers of photons, must be detected. For SiPMs, however, there is a trade-off between photon detection efficiency (PDE) and linearity. For a fixed SiPM area and fixed dead-space between individual elements, as the number of APD cells in the array is decreased, the geometric efficiency increases, resulting in higher PDE. For high intensity light pulses (i.e. conversion of high energy gamma rays in the scintillator) the number of APDs that absorb multiple photons also increases as the number of APDs is decreased. Since the charge produced by a single APD in Geiger mode is independent of the number of photons absorbed, the response of the SiPM becomes more non-linear.

The impact of non-linearity on the average signal level (i.e. the peak positions in a pulse-height spectrum) can be corrected by proper calibration. In additional to changing the peak positions, non-linearity affects the energy resolution of a scintillation detection system. If the non-linearity becomes severe enough, it will significantly degrade the measured energy resolution of the system, which can result in improper imaging.

Thus, there exists a need in the art to correct for the above described non-linearities in order to facilitate imaging accuracy.

SUMMARY OF THE TECHNOLOGY

Therefore, provided is a scintillation detector including one or more silicon photomultipliers (SiPM) coupled to linearization apparatus which compensates for non-linear data received by a SiPM.

Further provided is a positron emission tomography (PET) system that includes a PET scanner, one or more SiPM attached to the PET scanner, a scintillation block optically in communication with the SiPM, and a processor for receiving outputs from the SiPM. The processor can be connected to a display to display collected and corrected data.

BRIEF DESCRIPTION OF THE DRAWINGS

The technology will now be described in greater detail in the following by way of example only and with reference to the attached drawings, in which.

DETAILED DESCRIPTION OF THE TECHNOLOGY

Figure 1:
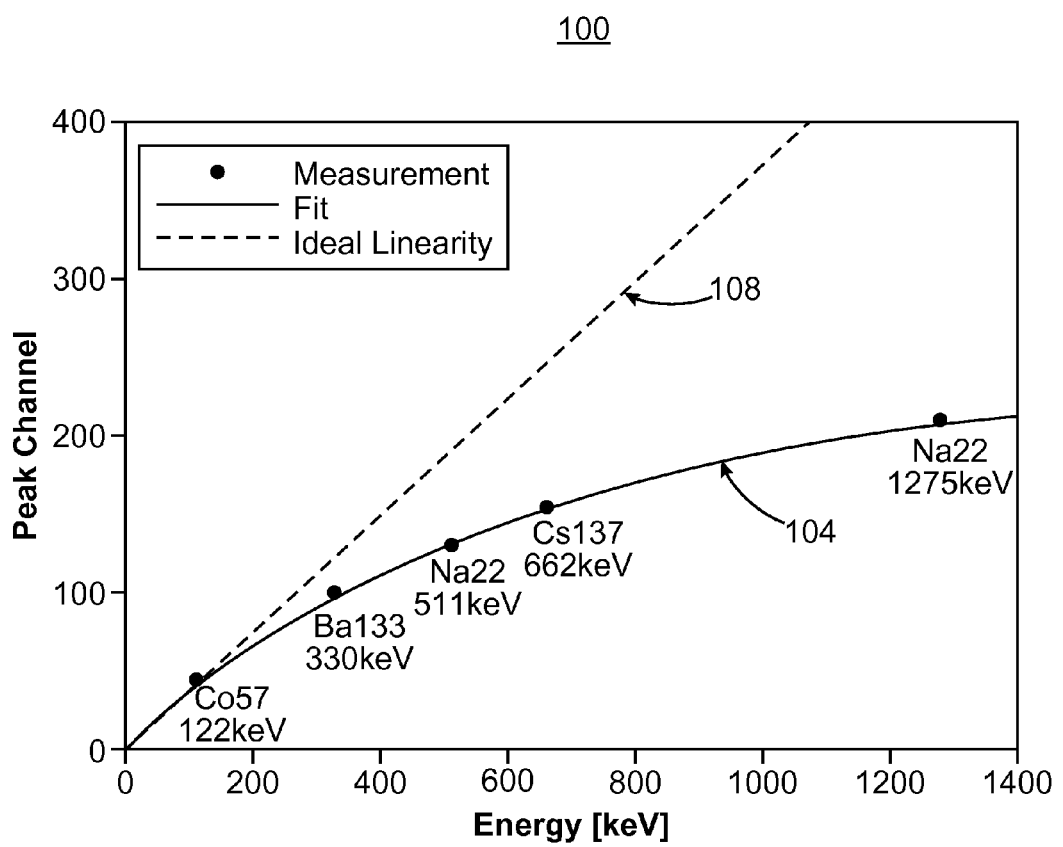
FIG. 1 shows a non-linear plot of a known 3×3 mm$^2$ SiPM output signal, and the plot of an ideal linear curve.

Disclosed below are detailed embodiments of the present technology; however, the disclosed embodiments are non-limiting examples of the technology that may be embodied in various and alternative forms. Therefore, there is no intent that specific structural and functional details should be limiting, but rather the intention is that they provide a basis for the claims and serve to teach one skilled in the art to variously employ the present technology.

The following are non-limiting explanatory definitions of certain terms used within the disclosure. A photosensor is an electronic component that detects the presence of visible light, infrared transmission (IR), and/or ultraviolet (UV) energy. Many photosensors consist of semiconductor having a property called photoconductivity, in which the electrical conductance varies depending on the intensity of radiation striking the material. Positron emission tomography (PET) is a nuclear medicine imaging technique that produces a three-dimensional image or picture of functional processes in the body. The system detects pairs of gamma rays emitted indirectly by a positron-emitting radionuclide (tracer), which is introduced into the body on a biologically active molecule. Three-dimensional images of tracer concentration within the body are then constructed by computer analysis. In modern scanners, three dimensional imaging is often accomplished with the aid of a CT X-ray scan performed on the patient during the same session, in the same machine. An avalanche photodiode (APD) is a highly sensitive semiconductor electronic device that exploits the photoelectric effect to convert light to electricity. APDs can be thought of as photo-detectors that provide a built-in first stage of gain through avalanche multiplication. Scintillation is a flash of light produced in a material by an ionization event. A scintillator is a material, which exhibits scintillation—the property of luminescence—when excited by ionizing radiation. 'In communication' refers to a situation in which two or more elements or devices are able to communicate energy or data between them, either directly or indirectly.

Key performance metrics, such as energy resolution and timing resolution, are often limited by photon detection statistics. SiPMs have the potential to offer much higher PDE than photomultiplier tubes (PMTs), but they will be inherently non-linear when designed for and operated at high PDE.

Knowing the magnitude of the non-linearity is important for understanding its impact on energy resolution and making appropriate design trade-offs. The degree of non-linearity is strongly influenced by the ratio of the number of photons detected to the number of cells in the SiPM. The reset behavior of the individual APDs also affects the non-linearity. If an individual APD can recharge within the scintillation decay time and be available to fire multiple times during a single scintillation event, the non-linearity will be reduced. Optical cross-talk between neighboring APDs, however, further increases the non-linearity. For applications that require excellent energy resolution, only a small non-linearity may be tolerable. Thus correction or compensation for non-linearity of SiPMs is desirable. Having a mathematical expression that approximates the correct form of the non-linearity may be useful for energy calibration. See for example, K. C. Burr and G. C. Wang. "Scintillation detection using 3 mm×3 mm silicon photomultipliers" IEEE Nuclear Science Symposium Conference Records. 2007, pp. 975-982, which is fully incorporated by reference herein.

SiPMs are non-linear due to their having a finite number of microcells, especially in applications where a large amount of light will impinge on the SiPM surface. The non-linearity occurs because the individual SiPM cells do not act as proportional sensors. They only provide a binary "ON" signal, if an avalanche is triggered by one or more photons on the active area. In some cases the SiPM output signal can even saturate completely from too much light. For a 511 keV in LSO, (PET application) it is expected that 10,000 photons will be created within the crystal and to potentially reach the SiPM surface. Many SiPMs have only 100 to 1000 microcells per $mm^2$. Current state-of-the-art clinical PET systems use 4×4×20 $mm^3$ L(Y)SO crystals. If the PET detector were readout with one SiPM per crystal, then a 4×4 $mm^2$ SiPM would be used and may only have 1600 to 16,000 microcells. However, if the number of microcells is of the order of the number of expected photons or even lower, then substantial non-linearity and energy saturation will occur. This non-linearity is shown in FIG. 1, for a known 3×3 $mm^2$ SiPM with 3600 microcells coupled to a 3×3×20 $mm^3$ Lutetium Oxyorthosilicate (LSO) crystal. FIG. 1 illustrates a plot 100 of the output signal 104 of the photopeak (peak channel) against the energy of the photopeak for a given set of radioisotopes. An exponential rise to maximum curve is fitted to the experimental data using the equation $J=a*(1-\exp(-b*x))$. FIG. 1 also shows an ideal linear curve 108 for comparison.

Figure 2:
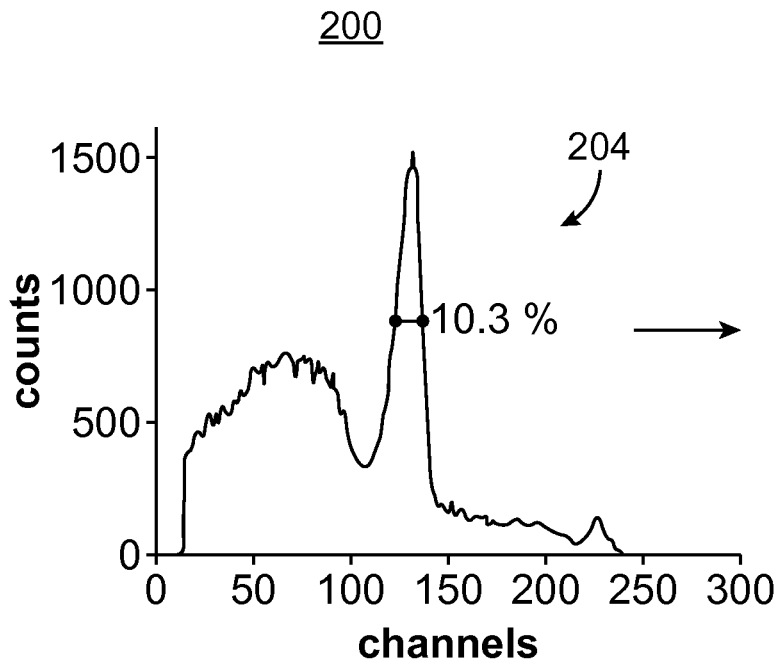
FIG. 2 shows the energy spectra and position profile relationship of the SiPM output signal.
Figure 2:
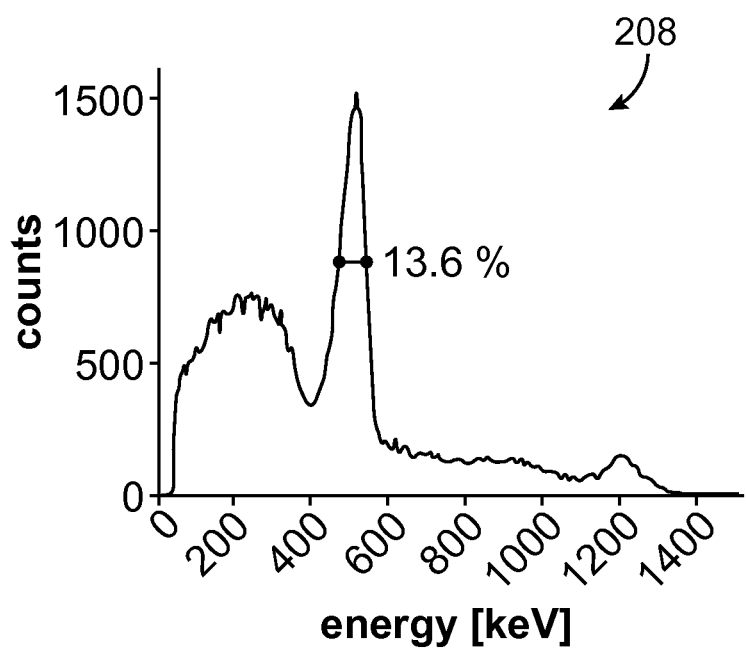

By measuring the non-linearity of the SiPM, the distortion and compression of the energy spectrum can be corrected and the real energy photopeak position and resolution can be calculated. A comparative example 200 of this is shown in FIG. 2. It is necessary to correct the energy scale as shown in order to obtain realistic energy photopeak position and resolution. By measuring the non-linearity of each SiPM in an array individually 204, the raw SiPM signal data can be corrected in real-time to obtain a corrected position profile and energy spectra 208. See for example A. Kolb. M. S. Judenhofer, E. Lorenz. D. Renker. B. J. Pichler. "PET block detector read-out approaches using G-APDs", IEEE Medical Imaging Conference Records. 2008, which is fully incorporated by reference herein. The individual SiPMs non-linearity value can be determined experimentally by measuring their output signals with various radioisotopes and fitting the energy vs. output signals to an exponential rise to maximum curve, as described in FIG. 1.

It has generally been assumed that energy scale compression is unimportant for PET data acquisition as long as the energy window around the 511 keV peak is matched to the compressed scale. In that instance the energy selection would work equally well on the compressed or on the corrected energy scale. While this is true for block detectors, which act as a single detector and therefore do not exhibit non-linearity distortions from inter-crystal scatter within the block, this effect would have a detrimental effect on PET detectors that consist of one-to-one (1-1) coupled detectors—one scintillator crystal coupled to one photosensor. The detrimental effect is the result of the fact that the amount of signal output produced by a single photoelectric event in a single crystal is not equivalent to the output of multiple Compton events produced in multiple crystals. For a 1-1 coupled detector array consisting of 4×4×20 $mm^3$ LSO crystals, approximately half of the 511 keV gamma ray events scatter from one crystal to one or more other crystals before depositing all of its energy. If this problem is not corrected for or compensated for properly, it can result in a large sensitivity loss and cause inaccuracy of imaging. The technology provides a correction method that can be applied in real time (or with the use of a lookup table) to the acquired data which will result in an improvement of energy photopeak position and resolution.

Figure 3:
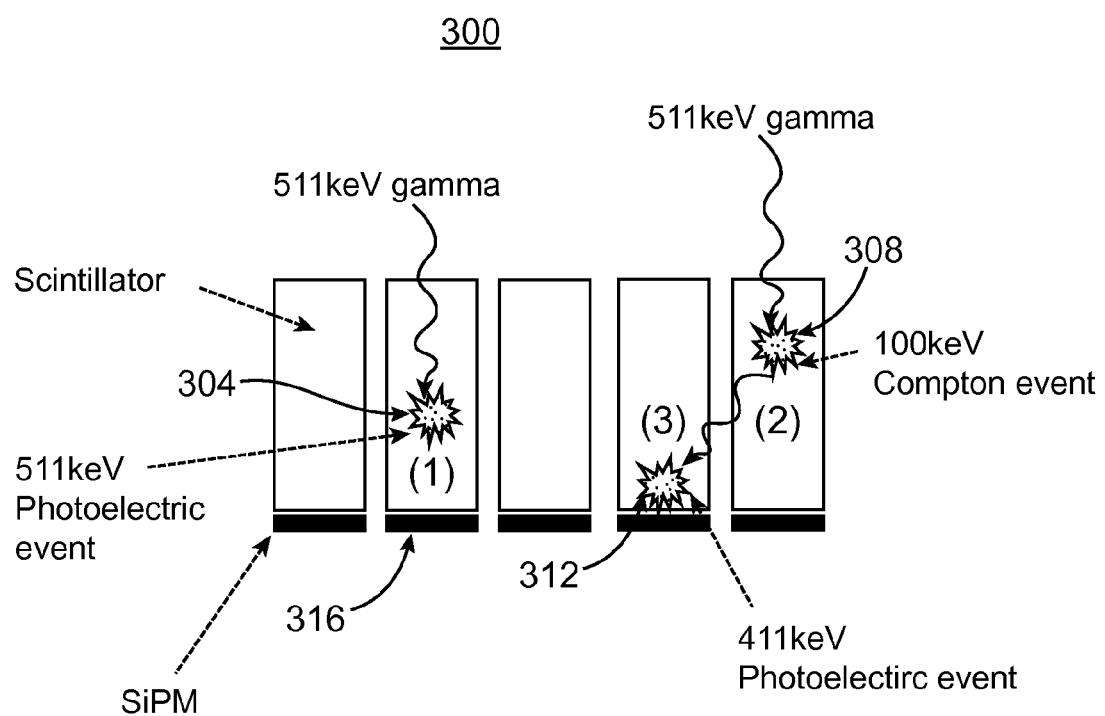
FIG. 3 shows comparison of single energy source event to a multi-energy source event.

FIG. 3 illustrates an example 300 of the energy produced from a single 511 keV photoelectric event 304 compared to the energy produced from an inter-crystal scattered event (one Compton event 308+one photoelectric event 312). According to FIG. 1, the SiPM 316 output from 304 would be 130 a.u.

while the output from 308 would be 40 a.u. and 312 would be 115 a.u. Therefore, 308+312>304 though the deposited gamma energies are equal.

As shown in FIG. 3, when a 511 keV gamma ray photoelectric event occurs in a single crystal, the SiPM 316 output is a unique but non-linear function of the gamma ray energy. This results in a reduced SiPM 316 output signal. But when the same 511 keV gamma ray is scattered between two or more crystals, the multiple SiPM 316 outputs are more linear with respect to the deposited gamma ray energy. According to the plot of FIG. 1, the SiPM 316 output of (1) would be 130 a.u. while (2) would be 40 a.u. and (3) would be 115 a.u. Therefore, (2)+(3)>(1) though the total deposited gamma ray energies are equal. This photo peak spreading effect becomes worse as the gamma ray deposits its energy over more crystals since the energy deposited is a smaller amount per crystal and thus more linear.

Figure 4:
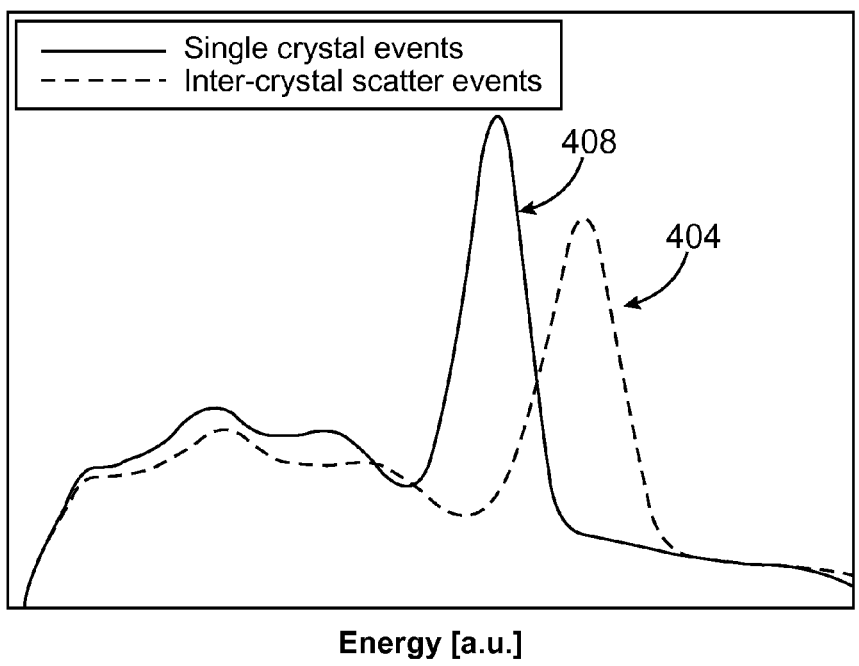
FIG. 4 shows a comparison of a 511 keV gamma ray interaction with a single crystal to an interaction with multiple crystals.

FIG. 4 illustrates an example of the energy spectrum for 511 keV gamma rays interacting in a single crystal as compared to the energy spectrum from 511 keV gamma rays interacting between multiple crystals. The inter-crystal scatter energy spectrum 404 has a photopeak higher than the photopeak for the single crystal events 408 and is more linear. Note that depending on the ratio of gamma ray energy shared between the two or more crystals this will result in a spread of photopeak positions ranging from a minimum photopeak position in the single crystal case to a maximum photopeak position in the perfectly linear case.

However, by measuring the non-linearity of each SiPM 316 in the detector, the raw SiPM 316 signal data can be corrected to obtain a corrected energy spectrum. The individual SiPMs' non-linearity values can be determined experimentally by measuring their output signals with various radioisotopes and fitting the energy vs. output signals to an exponential rise to maximum curve, as described in FIG. 1.

Figure 5:
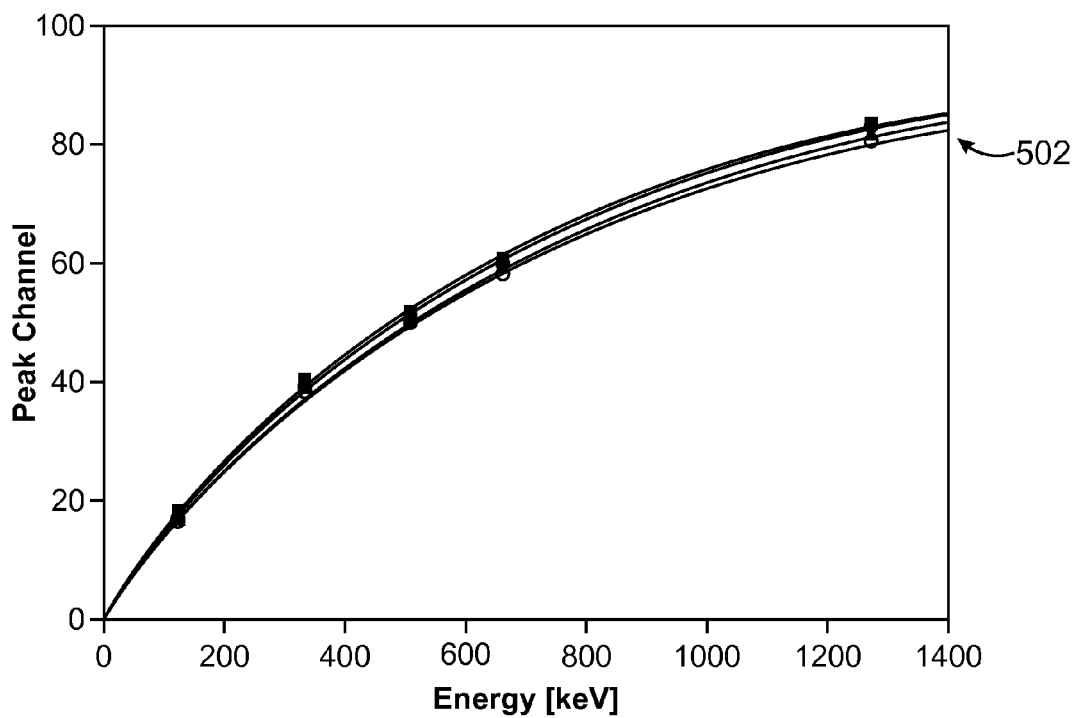
FIG. 5 shows linearity curves for four SiPMs.

FIG. 5 illustrates an example of these individual data curves for many SiPMs 316. These fit-values can then be used to correct the raw SiPM 316 signal data, the result of this as shown below in FIG. 6. FIG. 5 shows energy linearity curves 505 for four SiPMs 316. The curves 505 show a very similar non-linearity relationship because the four SiPMs 316 have the same number of microcells and same design.

Figure 6:
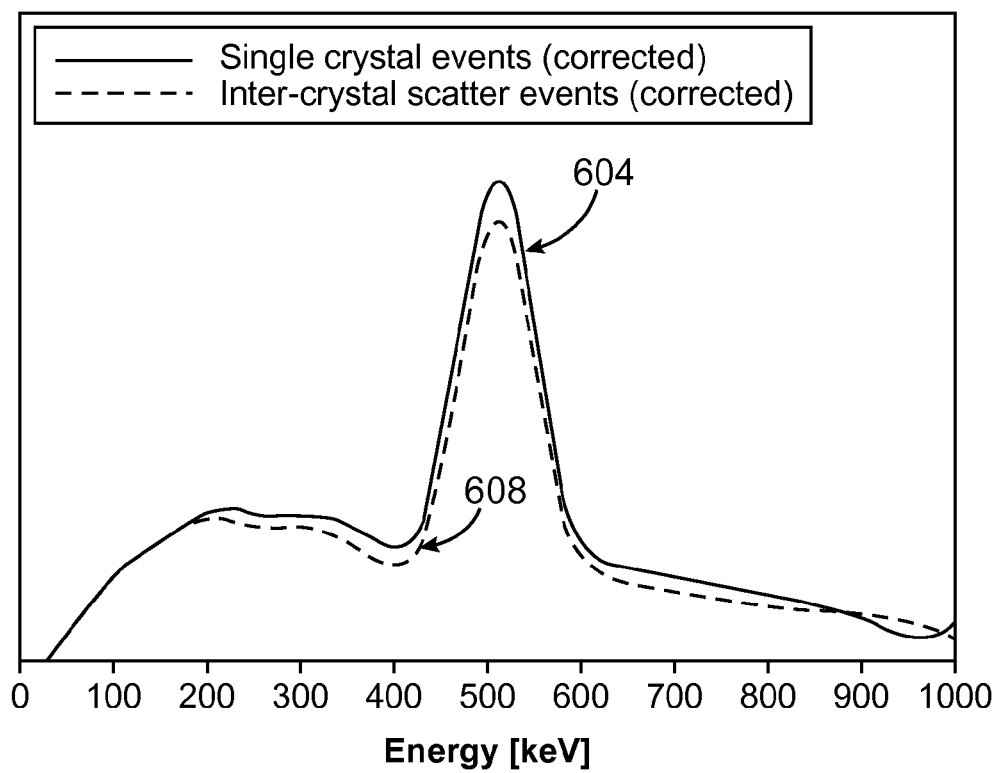
FIG. 6 shows a comparison of a corrected 511 keV gamma ray single crystal event to a corrected 511 keV gamma ray inter-crystal event.

FIG. 6 shows the corrected energy spectra for a single crystal and inter-crystal scatter events. Correcting the raw SiPM 316 output values according to the SiPM 316 non-linearity relationship can align the 511 keV photopeaks for all event types. Ideally, correction is performed on every individual SiPM 316 output before multiple or scattered events are summed. FIG. 6 is a qualitative illustration of energy spectra of 511 keV gamma rays interacting in a single crystal corrected for non-linearity (solid line) 604 compared to the energy spectrum produced from multiple inter-crystal scatter events corrected for non-linearity (dashed line) 608. After correction within the technology, both 511 keV peaks are aligned.

Correcting the non-linearities of a SiPM 316 array enables optimization of 1-1 coupled detectors when inter-crystal scattering occurs within a detector array. The non-linearity correction procedures within the technology enable calculation of the actual or correct energy of a gamma interaction event in a 1-1 coupled, SiPM-based PET detector. Although discussions within this disclosure refer to the example of, the corrective techniques disclosed are applicable to SPECT detectors and any other radiation detection system utilizing scintillators and readout by non-linear SiPM 316 photosensors. The correction techniques within the technology are useful for applying SiPMs 316 for single-photon emission computed tomography (SPECT) imaging, because a series of different isotopes with different gamma ray energies are routinely used in SPECT.

To facilitate the efficiency and accuracy in data processing, the linearity correction of the output data of each SiPM 316 can be performed in real time during the acquisition, e.g. in an FPGA that receives the digitized raw data as input and has the non-linearity profile of each sensor stored from a previous calibration procedure (using several isotopes, as shown above in FIGS. 1 and 5).

Figure 7:
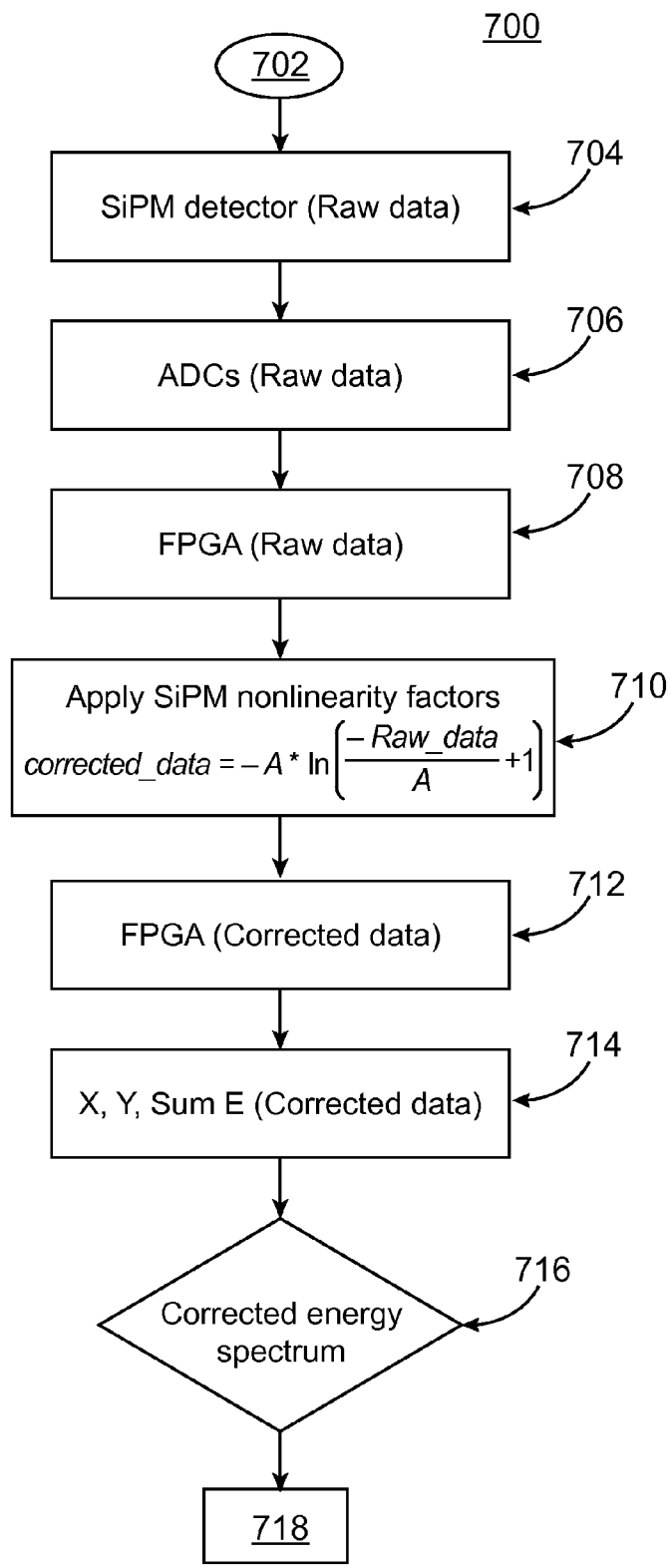
FIG. 7 shows an energy data correction method within the technology.

FIG. 7 is a flow chart illustrating steps of a method for obtaining corrected positioning and total energy data. Once the method starts 702, the method proceeds to 702 where data is collected 704 by an SiPM detector. Data received at 704 is then transmitted to an analog-to-digital converter at 706. Converted data is then transmitted to a programmable array at 708 where it is analyzed in real-time or by means of a lookup table. The analyzed data is then output to a linearization device at 710. The linearization device transmits corrected or linearized data to a programmable array at 712, which can be the same programmable array mentioned above. In one embodiment, the linearization device determines corrected data based on the equation $$\text{corrected\_data} = -A * \ln\left(\frac{-\text{Raw\_data}}{A} + 1\right).$$

Alternatively the linearization device may consult a lookup table to determine the corrected data.

The programmable array then outputs the linearized data to a summation unit which sums the collected energy data at 714. The summed data can then be transmitted to an acquisition device at 716 where it can be stored and subsequently used to reconstruct an image for diagnostic review. The method then ends 718. It will be understood that the method can be performed on an iterative basis to provide updated images in real-time.

Figure 8:
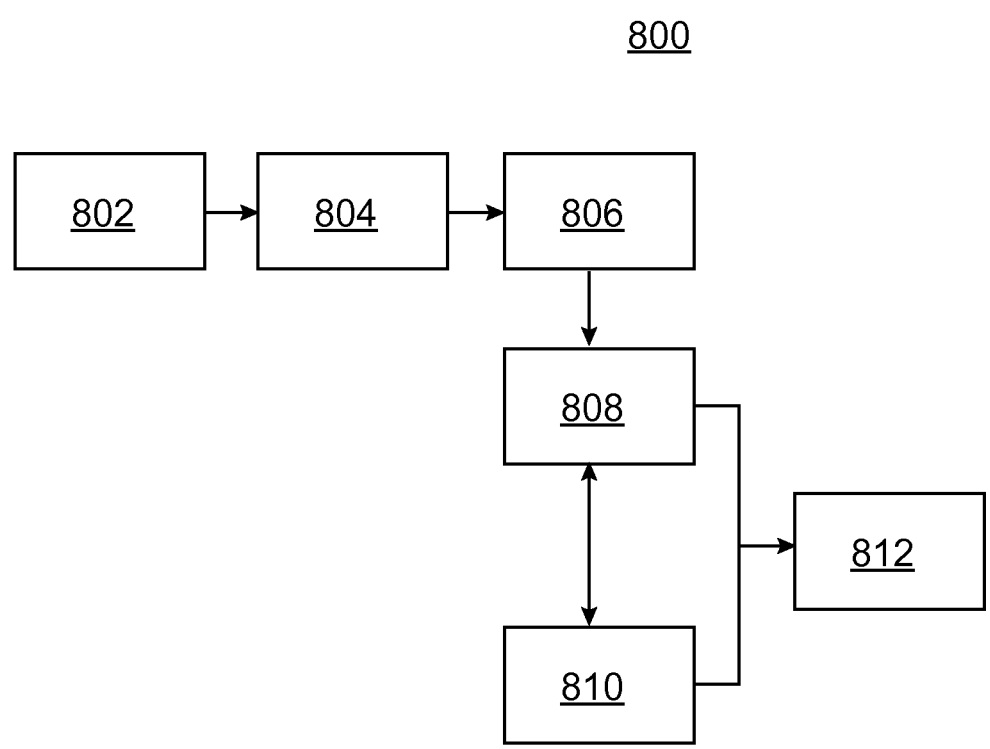
FIG. 8 show a block diagram of a system for energy data correction within the technology.

FIG. 8 is a system of collecting and correcting energy data in accordance with the technology. Scintillation data is detected by the scintillation detector 802. The detected data is then fed to an analog-to-digital converter 804 which digitizes the detected data. The digitized data can be output to a field programmable array 806 where it is configured for output to a linearization unit 808 which is programmed to convert non-linear data to linear data in the manner described above. The corrected data can be fed to summation unit 810, back to the programmable array 806 for further computation or sent directly to a display or other suitable device 812 for consideration by a physician or other medical personnel. Information generated by the summation unit can also be transmitted to the display or other suitable device 812.

The technology having been thus described, it will be apparent to those skilled in the art that the same may be varied in many ways without departing from the technological disclosure. Any and such modifications are intended to be covered within the scope of the following claims.

What is claimed is:

1. A system for correcting energy readings from a solid state photosensor having a plurality of microcells coupled to a single output electrode, comprising:
   at least one scintillator configured to receive at least one incident radiation particle and to convert energy from said particle into photoelectrons;

at least one solid state photosensor in communication with the at least one scintillator and configured to convert energy of said photoelectrons into an electrical signal;

an analog-to-digital converter (ADC) coupled to the output electrode at least one solid state photosensor and configured to convert an output from said output electrode into digital data;

a data analyzer in communication with the ADC and configured to receive said digital data; and a linearization system configured to receive output from the data analyzer and configured to determine at least one corrected datum corresponding to a least one raw datum output from the data analyzer in accordance with predetermined characteristics of said solid state photosensor, wherein the linearization system determines the value of corrected data as a function of the raw data by solving the equation:

$$\text{corrected\_data} = -A * \ln\left(\frac{-\text{Raw\_data}}{A} + 1\right)$$

wherein A is an experimentally determined constant corresponding to a SiPM nonlinearity relationship and Raw Data is the value of the at least one data output from the data analyzer.

2. The system of claim 1, wherein the data analyzer is a field programmable gate array (FPGA) configured to enable the system to operate in real-time.

3. The system of claim 2, wherein the linearization system is configured to receive raw data from the data analyzer and output corrected data to the data analyzer.

4. The system of claim 1, wherein the linearization system comprises:
executable program code for determining the values of corrected data; and
a controller configured to execute the executable program code that determines the values of corrected data.

5. The system of claim 1, further comprising a summation unit in communication with the data analyzer and configured to sum corrected data output from the data analyzer.

6. The system of claim 1, wherein the linearization system determines the value of corrected data as a function of the raw data by consulting a look-up table.

7. The system of claim 1, further comprising a display in communication with the linearization system and configured to display data output from the linearization system.

8. The system of claim 1, wherein the at least one solid state photosensor is a silicon photomultiplier (SiPM).

9. The system of claim 8, wherein for each at least one scintillator there is exactly one SiPM.

10. The system of claim 1, wherein the scintillator is a Lutetium Oxyorthosilicate (LSO) crystal.

11. A method of correcting output signals of a solid state photosensor having a plurality of microcells coupled to a single output electrode for non-linearities, comprising:
receiving at least one incident nuclear radiation particle on at least one a scintillator;
receiving at least one photoelectron associated with the at least one incident particle in at least one solid state photosensor from said at least one scintillator;
transmitting an electrical signal corresponding to an energy of said at least one photoelectron from said at least one solid state photosensor to an analog-to-digital converter (ADC) for conversion to digital data;
transmitting digital data received from the ADC to a data analyzer; and
transmitting the data received at the data analyzer to a linearization system configured to correct a non-linearity associated with said solid state photosensor corresponding to a least one raw datum output from the data analyzer,
wherein the linearization system determines the value of corrected data as a function of the raw data by solving the equation:

$$\text{corrected\_data} = -A * \ln\left(\frac{-\text{Raw\_data}}{A} + 1\right)$$

wherein A is an experimentally determined constant corresponding to a SiPM nonlinearity relationship and Raw Data is the value of the at least one data output from the data analyzer.

12. The method of claim 11, wherein the linearization system determines the value of corrected data as a function of the raw data by consulting a look-up table.

13. The method of claim 11, wherein the data analyzer is a field programmable gate array (FPGA) configured to enable the system to operate in real-time.

14. The system of claim 11, wherein the at least one photomultiplier is a silicon photomultiplier.

15. A system comprising a computer recordable storage medium tangibly embodying computer executable program code, which when executed by a controller, causes the system to receive data from a data analyzer and calculate corrected data corresponding to raw data output from the data analyzer as a function of the raw data by solving the equation:

$$\text{corrected\_data} = -A * \ln\left(\frac{-\text{Raw\_data}}{A} + 1\right)$$

wherein A is an experimentally determined constant corresponding to a SiPM nonlinearity relationship and Raw Data is the value of the at least one data output from the data analyzer.

* * * * *